June 28, 1960  C. C. BAUERLEIN  2,942,837
PNEUMATIC CONTROL VALVE
Filed April 15, 1958  2 Sheets-Sheet 1

Inventor
Carl C. Bauerlein
by Hill, Sherman, Meroni, Gross & Simpson Attys

June 28, 1960 C. C. BAUERLEIN 2,942,837
PNEUMATIC CONTROL VALVE
Filed April 15, 1958 2 Sheets-Sheet 2

Inventor
Carl C. Bauerlein
by Hill, Sherman, Meroni, Gross King Attys

United States Patent Office 2,942,837
Patented June 28, 1960

2,942,837

PNEUMATIC CONTROL VALVE

Carl C. Bauerlein, Lincolnwood, Ill., assignor to The Dole Valve Company, Morton Grove, Ill., a corporation of Illinois Filed Apr. 15, 1958, Ser. No. 728,630

1 Claim. (Cl. 251—28)

This invention relates to fluid control valves and more particularly relates to an improved means for controlling the operation of a pilot operated diaphragm valve.

Pilot operated diaphragm valves are utilized for controlling the flow of fluid through a port in control valves such as mixing valves, fluid shut off valves, and the like and are generally individually solenoid controlled. Since, however, most control valves generally incorporate two, if not three, pilot operated diaphragm valves, they necessitate the provision of two or more solenoid control units for each control valve. Since solenoid control units are relatively expensive, it has been found advantageous to provide an alternate, less expensive, means for actuating the pilot valve.

Accordingly, applicant has devised a simple, inexpensive, readily assembled pneumatic means for controlling the actuation of a diaphragm shut off valve which is of simple design and is and may be readily and economically manufactured.

Applicant has accordingly provided a means whereby a simple permanent magnet moved by pneumatic pressure differences is utilized to reciprocably move the pilot of a fluid operated diaphragm valve.

Applicant contemplates the provision of a generally cylindrical housing for a reciprocably movable spring biased magnetizable armature whereby a permanent magnet may be reciprocably moved on the outside of the housing to increase or decrease the magnetic attractive force acting on the magnetizable armature. Preferably, the armature will be spring biased toward the lower portion of the housing whereas the exteriorly mounted permanent magnet will be spring biased toward the upper portion of the housing and that pneumatic means will be incorporated to move the magnet downwardly along the side walls of the housing against the biasing force of a spring acting thereagainst to retractably move the armature within the housing against the biasing force acting downwardly thereon to unseat the armature from the pilot passageway through a flexible annular diaphragm valve.

It is, accordingly, a principal object of this invention to provide a pneumatic control means for a pilot operated diaphragm valve.

It is another object of this invention to provide, in a device of the class described, a permanent magnet for moving the armature wherein the magnet is movable with respect to the armature containing housing to vary the attractive force acting on the armature.

It is a still further object of this invention to provide a device of the type above described wherein the magnet is pneumatically movable with respect to the armature containing housing.

These and other objects of the invention will become apparent from time to time as the following specification proceeds and with reference to the accompanying drawings, wherein.

Figure 1:
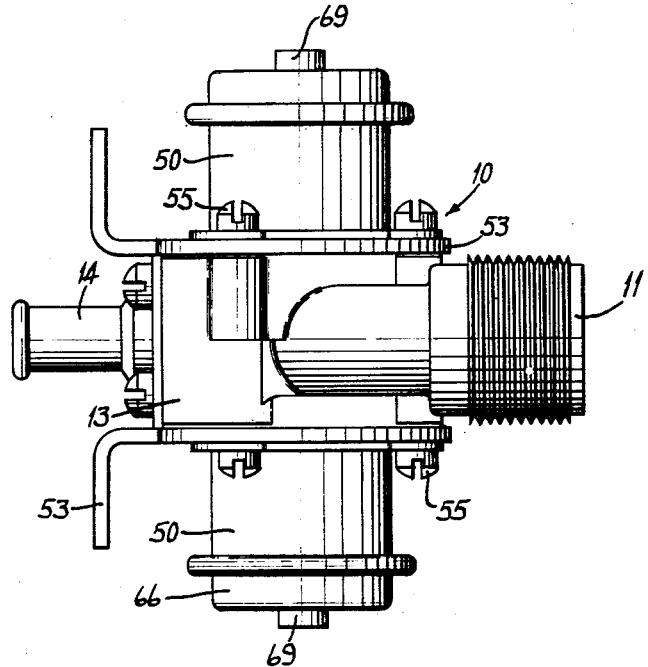
Figure 1 is a side elevational view of a mixing valve embodying the principles of this invention.
Figure 2:
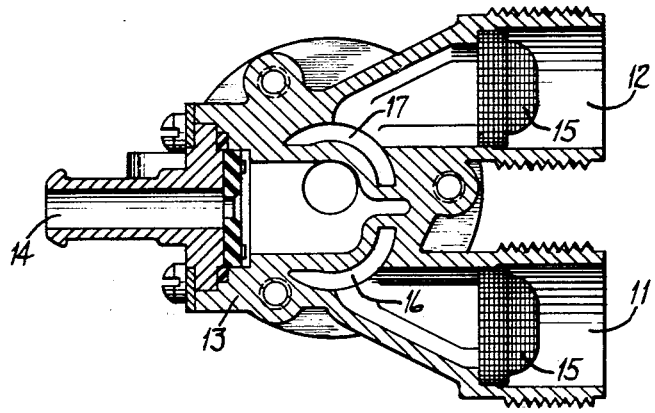
Figure 2 is a horizontal sectional view through the device illustrated in Figure 1.
Figure 3:
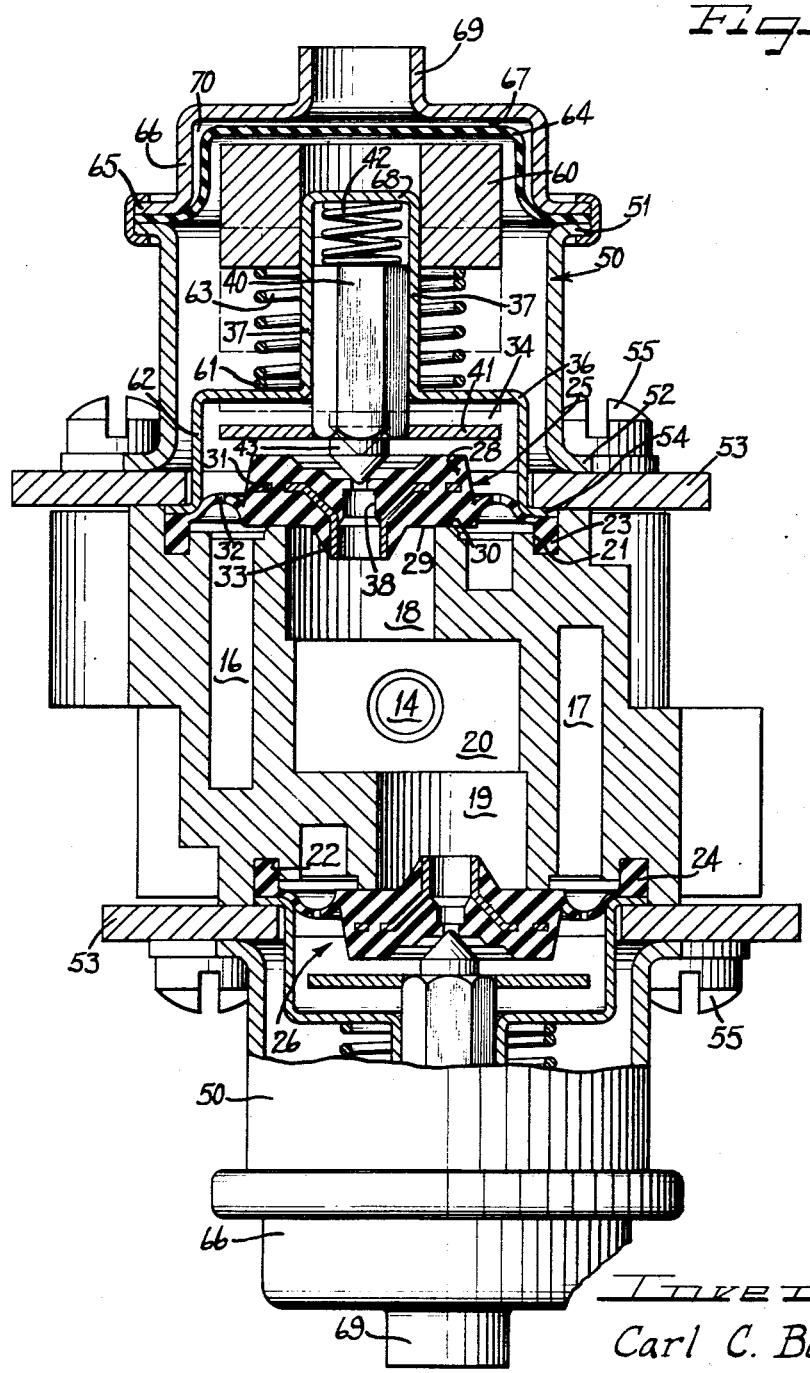
Figure 3 is a vertical sectional view through the mixing valve illustrated in Figure 1 embodying the principles of the present invention.

In the embodiment of the invention illustrated in the drawings, there is shown a mixing valve 10 having hot and cold fluid inlets 11 and 12, respectively, leading into the valve body 13 thereof and having an outlet 14 leading therefrom.

The inlets 11 and 12 are each shown as having filter screens 15 therein for filtering out foreign particles which may be present in the fluid flowing to the valve and as leading to annular fluid passageways 16 and 17 which open to opposite sides of the valve body 13.

A pair of fluid ports 18 and 19 open to opposite sides of the valve body 13 and are formed concentrically with and interiorly of the annular fluid passages 16 and 17, respectively, and open to a mixing chamber 20 which, in turn, is communicable with the outlet 14 from the valve body.

Annular grooves 21 and 22 are provided at each open end of the valve body to receive annular depending lips 23 and 24 of a pair of pilot controlled diaphragm valves 25 and 26. Since the diaphragm valve actuating means are preferably the same for each of the diaphragm valves 25 and 26, it will suffice to give a complete description of the hot fluid diaphragm control valve 25.

The diaphragm valve 25 is preferably formed from rubber, an elastomer, or other similar resilient material and has a thickened central portion 28, an inner face 29 of which is engageable with an annular seat 30 extending around the port 18 to block the flow of fluid from the annular passage 16 to the outlet 14. The thickened central portion 28 of the diaphragm valve 25 is further shown as having a flanged metal insert 31 molded therein for reenforcing the same. The metallic insert 31 within the thickened portion 28 of the diaphragm valve 25 is further shown as having a tubular boss 33 projecting from the face 29 of the valve which forms an extension of the central passageway 38 leading through the diaphragm valve.

The diaphragm valve 25 is also provided with a bleeder passageway 32 through the relatively thin walls of the diaphragm valve 25 outwardly of the thickened portion 28 thereof which leads from the annular passage 16 to a diaphragm chamber 34 formed between the upper lateral surface of the diaphragm valve 25 and the inside of an end closure cap 36 which has a central integrally formed guide 37 extending therefrom. It is, of course, obvious to those skilled in the art that more than one bleeder passageway may be provided within the diaphragm valve 25 and that the number and size of bleeder passageways governs the speed of valve closing movement and reduces the chances of valve failure due to the presence of foreign materials in the bleed passageways. The total area of the bleeder hole or holes must, however, be less than the area of the central passageway 38.

A pilot 40 is movably positioned within the guide 37 and has a valve portion 43 formed integrally therewith on the outer end thereof which is cooperable with the passage 38 to control the flow of fluid therethrough. The pilot 40 may be formed of magnetizable material having low magnetic retentivity such as soft iron. It may on the contrary be formed of a non-magnetic material such as brass but in such a case a magnetizable disk 41 should be secured there to (such as by a press fit) to form the element attracted by the permanent magnet 60, hereinafter to be described. It is also possible to employ both a magnetizable pilot member 40 and a magnetizable disk 41 where greater attractive force is to be required. In each of these three situations there must be at least one portion which is magnetizable and hence the pilot unit (whether it is a magnetizable pilot by itself or a pilot with a magnetizable element thereon) will hereinafter be referred to as the armature.

As has been hereinbefore explained, when the valve portion 43 is moved downwardly to close the passageway 38 fluid enters the diaphragm chamber 34 from the annular passageway 16 through the bleed passageway 32 to thus equalize the pressure acting on each side of the diaphragm valve 25. Since the fluid exposed area above the diaphragm is greater than that below the diaphragm there is a net downward fluid force which maintains the diaphragm closed against seat 30. When, on the other hand, the valve portion 43 of the pilot 40 is moved out of engagement with the end of the passageway 38, fluid will flow out of the upper chamber 34 through the central passageway 38 faster than fluid can flow into it through bleeder hole 32 and the fluid pressure force differential will cause the diaphragm valve 25 to open and permit passage of fluid from the annular passageway 16 to the port 18.

As has been hereinbefore mentioned solenoids have generally been used to effect retractable movement of the pilot within the guide but the use of solenoids is relatively expensive and, accordingly, applicant has devised an improved means for effecting retractable movement of the pilot.

In the illustrated form of the invention a cylindrical magnet housing 50 having annular flanged edges 51 and 52 extends about the end cap 36. A yoke 53 extends about the annular flanged edge 54 of the end cap 36 to secure the end cap to the valve body and is secured thereto by means of self-tapping screws 55 which extend through the outer flanged edge 52 of the magnet housing 50 and through the yoke 53 into the valve body 13.

A cylindrical permanent magnet 60 formed of some suitable permanent magnet material such as "Alnico V" is slidably positioned about the guide 37 and is biased upwardly with respect to a shoulder 61 which is formed intermediate the radially enlarged base portion 62 of the end cap 36 and the guide portion 37 by a spring 63. A flexible diaphragm 64 closes off the upper end of the chamber and is peripherally seated on the flange 51 and maintained in engagement therewith by an annular flange 65 of an end closure cap 66 which is suitably secured to the magnet housing 50 by peening of the flanges 51 and 65, or the like. The end closure cap 66 is recessed as at 67 a sufficient distance so that the distance between the closed end 68 of the guide 37 and the inner annular surface of the end closure cap 66 is preferably as great as one-half of the length of the cylindrical magnet 60, for reasons which will hereinafter become apparent. The end closure cap 66 also has a tubular fitting 69 extending centrally therefrom to connect the pneumatic chamber 70 formed between the inner annular surface of the end closure cap 66 and the upper surface of the flexible diaphragm 64 with a source of pressurized air.

The power of the magnet 60 with respect to its associated armature is so chosen that when the magnet 60 is biased toward the upper end portion of the magnet housing 50 by the spring 63, the downward force exerted by the spring member 42 on the armature 40 is greater than the attractive force exerted by the magnet 60 on the armature. When, however, pressurized air is directed into the pneumatic chamber 70 through the fitting 69, the diaphragm 66 and consequently the magnet 60 are moved downwardly within the magnet housing 50 against the force of the spring member 63 and the attractive force exerted by the magnet on the armature is increased to the point where the armature 40 is drawn upwardly within the guide 37 against the force of biasing spring 42 to unseat the valve portion 43 from the end of the central fluid flow passageway 38 within the diaphragm valve 25.

Upon exhaust of the air within the pneumatic chamber 70 through the fitting 69, the spring member 63 will again move the magnet 60 upwardly within the magnet housing 50 to reduce the attractive force of the magnet and the aramature 40 will again be returned to the position illustrated in Figure 1 by the spring member 42.

It will herein be understood that this embodiment of the invention has been used for illustrative purposes only and that various modifications and variations of the present invention may be effected without departing from the spirit and scope of the novel concepts thereof.

I claim as my invention:

A pilot control assembly comprising a housing having an elongated fluid tight guide disposed therein, a magnetizable pilot slidably positioned within said guide, spring means disposed within said guide and biasing said pilot extensibly from said guide in one direction, an annular magnet disposed within said housing exteriorly of said guide and encircling said guide and axially movable with respect thereto, biasing means acting against said magnet and urging said magnet in a direction opposite said one direction toward a position generally axially beyond said pilot in said opposite direction, a diaphragm extending across the interior of said housing in abutting engagement with said magnet on the side thereof opposite from said pilot for movement of said magnet in said one direction only, and means providing greater fluid pressure on the opposite side of said diaphragm from said magnet than on the side thereof adjacent said magnet to effect axial movement of said magnet relative to said guide in said one direction against said biasing means to magnetically telescope said magnet and pilot by attracting and moving said pilot within said guide and said magnet in said opposite direction against said spring means.

References Cited in the file of this patent
UNITED STATES PATENTS

| | | |
|---|---|---|
| 2,564,894 | Glasgow | Aug. 21, 1951 |
| 2,612,188 | Persons | Sept. 30, 1952 |
| 2,629,401 | Miller | Feb. 24, 1953 |
| 2,708,092 | Smith | May 10, 1955 |
| 2,752,936 | Cantalupo | July 3, 1956 |